March 14, 1944.  T. BROWN ET AL  2,344,123
POWER LIFT
Filed June 26, 1941  3 Sheets-Sheet 1
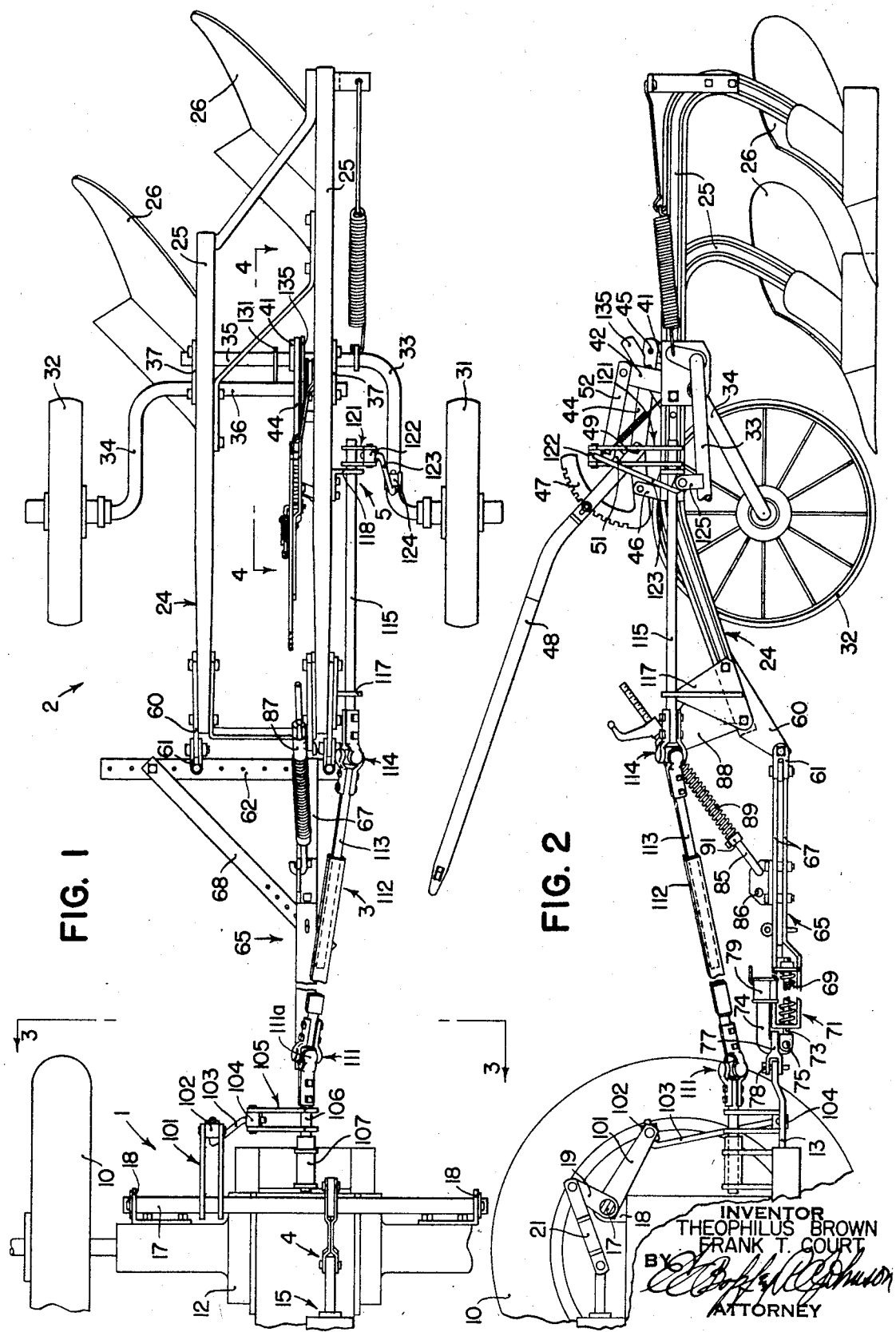
INVENTOR
THEOPHILUS BROWN
FRANK T. COURT
BY
ATTORNEY March 14, 1944. T. BROWN ET AL 2,344,123
POWER LIFT
Filed June 26, 1941 3 Sheets-Sheet 2

INVENTOR
THEOPHILUS BROWN
FRANK T. COURT
BY
ATTORNEY

March 14, 1944.  T. BROWN ET AL  2,344,123
POWER LIFT
Filed June 26, 1941  3 Sheets-Sheet 3

INVENTOR
THEOPHILUS BROWN
FRANK T. COURT
BY
ATTORNEY

Patented Mar. 14, 1944

2,344,123

UNITED STATES PATENT OFFICE 2,344,123

POWER LIFT

Theophilus Brown and Frank T. Court, Moline, Ill., assignors to Deere & Company, Moline, Ill., a corporation of Illinois Application June 26, 1941, Serial No. 399,852

10 Claims. (Cl. 97—50)

The present invention relates generally to agricultural implements and more particularly to implements of the towed type, i. e. those adapted to be pulled and/or operated by a farm tractor.

The object and general nature of the present invention is the provision of new and improved lifting means whereby the depth of operation of the tool or tools of a towed implement may be controlled by power derived from the tractor. More specifically, it is a feature of this invention to provide means whereby a hydraulically operated unit on the tractor is connected to raise and lower the implement tool or tools through the agency of a generally longitudinally extending torque shaft which is so constructed and arranged as to effectively control the tool means but not interfere with the relatively wide lateral swinging of the implement relative to the tractor, as when making a turn with the tool or tools in raised position. Particularly, it is a feature of this invention to provide a torque shaft lifting mechanism connected through a universal joint with an operating member on the tractor, with the parts so constructed and arranged that when the implement is in its raised position, one axis of the universal joint is disposed generally vertically and generally in coincidence with the vertical axis about which the implement pivots relative to the tractor, whereby when the tool or tools are raised, the hitch connection and the torque shaft pivot laterally about a common axis, thereby facilitating the making of short turns, as at the headlands.

Another important feature of this invention is the provision of a torque shaft, operatively connecting a power unit on the tractor with the raising mechanism of the implement, which includes detachable sections, and where the implement itself is connected with the tractor by overload release means, whereby when the latter operates to release the implement, the power connection between the power unit on the tractor and the implement raising mechanism is also automatically released. Further, in this connection, it is an additional feature of the present invention to provide a power actuated unit on the tractor operable through a range which is not only sufficient to raise and lower the tools but also is sufficient to be moved an additional amount, more than any deflection that may take place in the torque shaft, so that the implement may readily be reconnected with the tractor and the power lifting connections readily reconnected by simply inserting one sectional torque shaft portion in the cooperating portion. Still further, it is another feature of this invention to provide means for limiting the lowered position of the tool means or associated parts so that, upon the release of the overload mechanism and the consequent disconnection of the lifting connections, the tool or tools will not be permitted to move into any abnormal position in which a reconnection might be inconvenient or difficult. Another feature of this invention is the provision of controllable means effective to latch the tool or tools in their raised position so as to provide for transporting the implement from one place to the other and at the same time relieve the torque shaft connection from the burden of holding the tool or tools in their raised position. It is also a feature of this invention to provide latch means for holding the tool or tools raised when the implement is disconnected from the tractor and the power unit thereon that normally controls the position of the tools in operation.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a plan view of a tractor-propelled implement in which the principles of the present invention have been incorporated;

Figure 2 is a side view of the machine shown in Figure 1;

Figure 3:
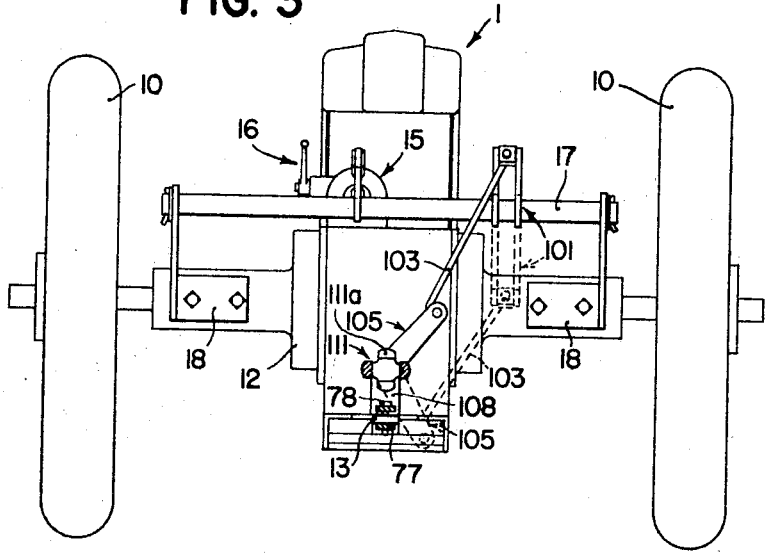
Figure 3 is a view taken generally along the line 3—3 of Figure 1 and looking forwardly toward the rear end of the tractor.

Referring now to the drawings, more particularly to Figures 1 and 2, the present invention is shown as incorporated in an agricultural machine comprising a tractor 1, an implement, such as a plow 2, and suitable power operated connecting mechanism, indicated in its entirety by the reference numeral 3, extending between a power unit, indicated by the reference numeral 4, and tool raising and lowering mechanism, indicated in its entirety by the reference numeral 5.

The tractor 1 is largely conventional, including rear traction wheels 10 secured to axle shafts journaled for rotation in a rear axle structure 12, the latter also carrying a drawbar 13 to which implements and other loads may be connected. Generally, as will be explained in detail below, the implements or other loads connected with the drawbar 13 are arranged to swing generally laterally. The tractor 1 preferably is equipped with a power unit 4 of the hydraulic type, embodying a cylinder and ram unit, indicated by the reference numeral 15 controlled by valve mechanism 16 and adapted to swing a rock shaft 17 on the tractor and to hold the rock shaft 17 in different positions of adjustment. The power unit 4 may be of any suitable construction, and our present invention is not particularly concerned with the details per se of the power unit. Generally, such a unit includes a source of fluid pressure driven by the tractor motor and operative to control the cylinder and ram unit in any suitable way. Preferably, however, the control means 16 is similar to that shown in the United States Patent No. 2,286,256, issued June 16, 1942, to Theophilus Brown, to which reference may be had if necessary. The rock shaft 17 is supported for rocking movement on the tractor by brackets 18, and the rock shaft 17 carries an arm 19 connected by a link 21 to the cylinder and ram unit 15.

The implement 2 preferably is in the form of a plow embodying frame means 24 in the form of a pair of tool beams 25 suitably braced and connected together and formed at their rear ends to receive a pair of plow bottoms or furrow openers 26. The implement frame 25 is supported, at least in part, by a pair of ground wheels 31 and 32 mounted, respectively, on a pair of crank axles 33 and 34, said crank axles having intermediate sections 35 and 36 which are connected by brackets 37 to the frame beams so as to accommodate rocking movement of the crank axles. The wheel 31 is a land wheel and the wheel 32 is a furrow wheel operating normally in the last furrow opened on the previous round. In order that the two wheel carrying crank axles 33 and 34 may be rocked in unison, an arm 41 is fixed to the intermediate portion 35 of the crank axle 33 and a second arm 42 is fixed to the intermediate portion 36 of the crank axle 34. A link 44 is connected with the arm 41 by a pin 45 and extends forwardly to an arm 46 fixed for pivotal movement with the implement frame 25, and the link 44 is extended, as at 47, to form a sector with which a hand lever 48 cooperates. The hand lever is pivoted at 49 on the link 44 and has an arm 51 pivoted to a link 52, the rear end of which is pivotally connected to the other crank axle arm 42. By this means when the hand lever 48 is locked to the sector 47, both crank axles are rocked in unison, and by disconnecting the hand lever 48 from the sector 47 and rocking the hand lever, the furrow wheel crank axle 34 may be rocked relative to the land wheel crank axle 33 for leveling the plow.

Plates 60 are fixed to the front ends of the beams 25 and receive clevis members 61 to which a transverse hitch bar 62 is connected. The hitch bar 62 forms a part of a hitch indicated in its entirety by the reference numeral 65 which is constructed along the lines of the hitch shown in the prior Patent 1,901,134, issued March 14, 1933, to C. G. Strandlund, to which reference may be had if desired. Briefly, the hitch 65 includes forwardly converging hitch bars 67 and 68, the hitch bar 67 comprising a pair of straps spaced apart at their forward ends to receive a cushioning spring 69 therebetween. The spring 69 forms a part of an overload release indicated in its entirety by the reference numeral 71 and which is similar to that shown in the prior Patent 1,919,915, issued July 25, 1933, to C. G. Strandlund. The overload release 71 includes a slidable member 73 whose sliding movement is resisted by the spring 69. A hook or arm 74 is pivoted at 75 to the forward end of the slidable member 73 and receives a clevis 77 that is pivoted to the rear end of the tractor drawbar 13 by a pivot bolt 78. The arm 74 has its rear end engaged in a slide 79 whose position along the upper member of the hitch bar 67 may be adjusted. If the implement should strike an obstruction or be subjected to an overload, the cushion spring 69 is compressed, permitting the member 73 and the arm 74 to slide forwardly until the rear end of the arm 74 is freed from the slide 79, whereupon the arm 74 swings forwardly and is disengaged from the tractor clevis 77.

A rod 85 is pivoted at its forward end to a bracket 86 fixed to the hitch bar 67, and the rear end of the rod 85 is slidably disposed in a sleeve 87 pivoted to the upper end of an arm or bracket 88 rigidly connected with the beams 25. A coiled spring 89 operates between the sleeve 87 and a collar 91 longitudinally adjustable on the rod 85 and secured to any point of adjustment by a set screw or the like. The spring 89 is adjusted so as to counterbalance the component of the force of the draft tending to cause the frame 24 to swing downwardly. This permits raising the hitch point between the hitch 65 and the implement frame a considerable distance above the line of draft extending from the tractor drawbar rearwardly and downwardly to the center of resistance between the two furrow openers 26.

The operating connections between the power unit 4 on the tractor and the implement will now be described.

An arm 101 is connected, as by welding or the like, to the tractor rock shaft 17, and at its outer end carries universal joint means 102 by which the upper end of a link 103 is connected with the arm 101. The lower end of the link 103 is connected by a similar universal joint 104 to the outer end of an arm 105 which is connected, as by welding or the like, to a longitudinally disposed shaft 106. The latter is mounted for rocking movement in a bearing 107 suitably carried by a bracket 108 which is fixedly secured to the drawbar or some other part at the rear of the tractor. The rear end of the longitudinal shaft 106 is connected by a universal joint 111 to a pair of telescopically associated shaft sections 112 and 113, the rear end of the latter being connected by a universal joint 114 to a shaft 115 carried on the implement by a pair of brackets 117 and 118. Secured to the rear end of the shaft 115 is an arm 121 that is connected by universal joint means 122 to the upper end of a link 123, and the lower end of the latter is connected by universal joint means 124 to a bracket 125 carried on or fixed to the land wheel crank axle 33. The shaft section 115 is disposed generally longitudinally, like the forward shaft section 106, and the telescopic shaft sections 112 and 113 connecting the shaft sections 106 and 115 are disposed generally above the hitch 65. The joint 111 is disposed substantiatlly directly above the pivot pin 78 connecting the front end of the hitch 65 to the tractor drawbar 13.

The operation of the structure so far described is substantially as follows:

When the furrow openers are in their operating position, the crank axles 33 and 34 are more or less approximately horizontal and the arm 121 on the implement is in its upper position. The flexibility afforded by the universal joints 111 and 114 accommodates both lateral and generally vertical swinging of the implement relative to the tractor as the outfit traverses uneven ground, passes over the tops of hills or rises and across gullies or low places. The rear universal joint 114 is adjacent the pivot connection between the hitch 65 and the front ends of the plow beams 25 so that any flexing as between the hitch and the implement is accommodated by the universal joint 114 acting in conjunction with the telescoping shaft sections 112 and 113.

When the operator desires to raise the tools out of the ground, he actuates the valve controlling mechanism 16 so as to rock the shaft 17 in a counterclockwise direction (Figure 2). This swings the outer end of the arm 101 upwardly and exerts a pull through the link 103 and swings the interconnected shaft sections 106, 112, 113, and 115 about a generally longitudinally extending axis generally in a counterclockwise direction (Figure 3). This causes the arm 121 to exert a downward thrust through the link 123 against the crank axle 33, and the reaction of this counter-clockwise movement exerts a lifting force through the brackets 118 and 117 against the frame of the implement, since both the crank axles 33 and 34 tend to swing together by virtue of the leveling linkage described above, thus raising the tools.

The parts are so arranged that when the tools are in their fully raised position the yoke 111a of the universal joint 111, which is disposed over the pivot 78, extends in a vertical position with its axis substantially coinciding with the axis of the pivot pin 78 (Figure 3). Thus, when the implement is in its raised position, it is free to swing laterally in either direction about its point of pivot connection with the tractor with substantially unlimited freedom. This permits making sharp turns with the outfit, as at the headlands or in other cramped or close quarters. When in operating positions (Figures 1 and 2), the various shaft sections, which constitute a lifting torque shaft, are disposed generally in longitudinal alignment so that variations in the lateral position of the implement relative to the tractor, as may occur during operation, have substantially no effect on the position of the tools. When plowing, the universal joint axis may or may not be vertical (see Figures 1 and 2), depending on the depth adjustment, but this is of no concern since in normal operation the tractor turns very little relative to the plow.

The hydraulic unit 4, with its controlling valve mechanism 16, is so constructed and arranged that the tools may be moved into various positions of adjustment, as desired, by proper operation of the valve mechanism 16.

It will thus be seen that we have provided a simple and sturdy mechanism by which the position of a tool or tools on a trailing implement may be easily and conveniently controlled from a power unit on the tractor. If the implement should strike an obstruction, causing the overload release to trip and freeing the implement from the tractor, a continued forward motion of the latter merely causes the front telescopic shaft section 112 to slide out of the rear telescopic shaft section 113, which stays with the implement. Thus, the power actuated lifting connections extending from the tractor to the implement are so constructed and arranged as to accommodate the release of the implement from the tractor whenever it is necessary or desirable that it should occur. The power unit and the arms and links associated therewith are so arranged that they have a range of movement somewhat greater than the corresponding range of movement of the lifting mechanism on the implement, specifically the arm 121. Thus, in reconnecting the implement to the tractor after its release by the overload trip device, all that it is necessary to do is to swing the power unit on the tractor into a lowered position and then back the tractor relative to the implement until the shaft sections 112 and 113 may be reengaged. Due to the fact that the tractor carried power lifting mechanism may be moved through a range greater than the range of movement of the implement carried lifting means, it is a relatively simple matter to move the forward telescopic shaft section 112 into a position for sliding over the rear telescopic shaft section 113, while at the same time taking care of whatever deflection may take place in the lifting connections. That is to say, the range of movement of the arm 101 and associated parts must be at least equal to the range of movement of the arm 121 plus the angular deflection that may take place in the torque shaft connection between the power unit on the tractor and the lifting mechanism on the implement.

In order to control the downward movement of the implement frame 25 and tools 26 when the implement is disconnected from the tractor, as by the overload release tripping, we prefer to provide means limiting the upward swinging movement of the crank axles 33 and 34 relative to the implement frame. To this end, we provide an arm 131 fixed to the intermediate section 35 of the crank axle 33, preferably by welding or the like, and the arm 131 is arranged so that in the lowermost position of the tools the arm engages the intermediate portion 36 of the furrow wheel crank axle 34. Thus, the arm 131 limits the downward position of the tools, as when the overload release trips when in operation.

When the outfit is transported from one field to the other or along highways or the like, it is, of course, desirable to hold the tools in their raised position, and in order to relieve the torque shaft connection between the power unit on the tractor and the raising means on the implement, and also in order to relieve the power unit 4 on the tractor, of this burden, we prefer to provide controllable latch means on the implement which, under the control of the operator serves to lock the tools in their raised position, preferably by means which engages an arm fixed to or movable with one of the crank axles so as to hold the latter with the wheels in a lowered position and the frame in a raised position.

Figure 4:
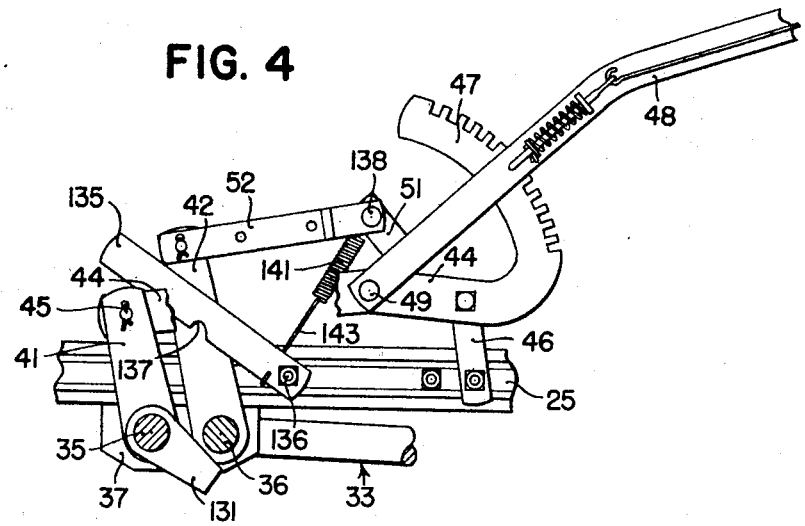
Figure 4 is a sectional view, on an enlarged scale, taken along the line 4—4 of Figure 1 and showing the stop means and latch means associated with the ground wheel crank axles, the parts being shown in the positions they occupy when the implement is in operating position.

Referring now more particularly to Figure 4, a latch member 135 is pivoted, as at 136, to the adjacent beam 25 and is provided with a notch 137 that is adapted to engage the inner extended end of the pin 45 connecting the upper portion of an arm 41 to the rear end of the link 44. A spring 141 is anchored at its forward or upper end to the pivot 138 between the arm 51 and the link 52 and at its rear or lower end carries a hook 143 which is detachably engageable with the arm 135. The rear end of the link 52, which the link 135 engages when the spring 141 is hooked thereto, serves as a stop for the link 135.

Figure 5:
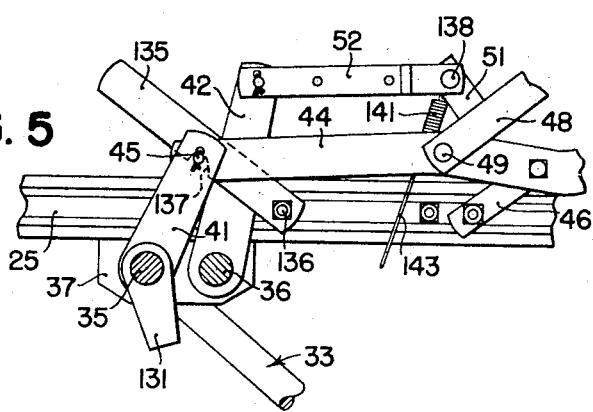
Figure 5 is a view similar to Figure 4, showing the parts in the positions they occupy when the implement is in its raised or transport position.

The operation of the latch mechanism is substantially as follows:

When in normal operation, the hook 143 is engaged with the latch 135 and holds the same away from the pin 45 on the crank axle arm 41. In this position of the latch 135, the arm 41 may swing back and forth without interference when the crank axles 33 and 34 are raised and lowered. When the operator finishes plowing the field and desires to move the outfit to another place, he disengages the hook 143 from the latch arm 135 while the plow is still in its lowered or operating position. The action of gravity then causes the latch 135 to ride on the pin 45. Then when the plow is raised into its transport position the arm 41 swings forwardly as the crank axle 33 is moved downwardly, and as the end of the pin 45 moves forwardly with the arm 41, the notch 137 in the latch lever 135 drops down over the end of the pin 45 and so prevents the arm 41 from swinging rearwardly, as shown in Figure 5. The power unit 4 on the tractor may now be actuated in the lowering direction to relieve the connections but the tools will be held in their raised position since the latch 135 now engages the pin 45 on the arm 41 and prevents the clockwise movement of the crank axles (Figure 2). This takes the strain off the lifting torque shaft and associated universal joints and other connections, and as a matter of fact, the tractor may, if desired, be entirely disconnected from the implement while the latter will be held in its raised position by virtue of the engagement of the latch with the arm 139. When the farmer reaches the next field to be plowed, assuming he has merely relaxed the torque shaft lifting connections and left the plow hitched to the tractor, before starting to lower the plow into its operating position, the farmer will first reengage the hook 143 with the latch 135. The spring 141 thus tends to swing the latch 135 away from the pin 45, but since the latter is sustaining the weight of the tools and frame, the spring is for the moment ineffective. After reengaging the spring 141 with the latch 135, the farmer then actuates the power unit 4 on the tractor in the lifting direction, thus relieving the pressure between the latch 135 and the pin 45, whereupon the spring moves the latch 135 into an inoperative position. Then the farmer actuates the unit 4 on the tractor in a lowering direction and thus sets the implement for operation. To this end, it is desirable that the power unit on the tractor has a somewhat greater range of movement at both extremes than the raising and lowering mechanism on the implement.

Figure 6:
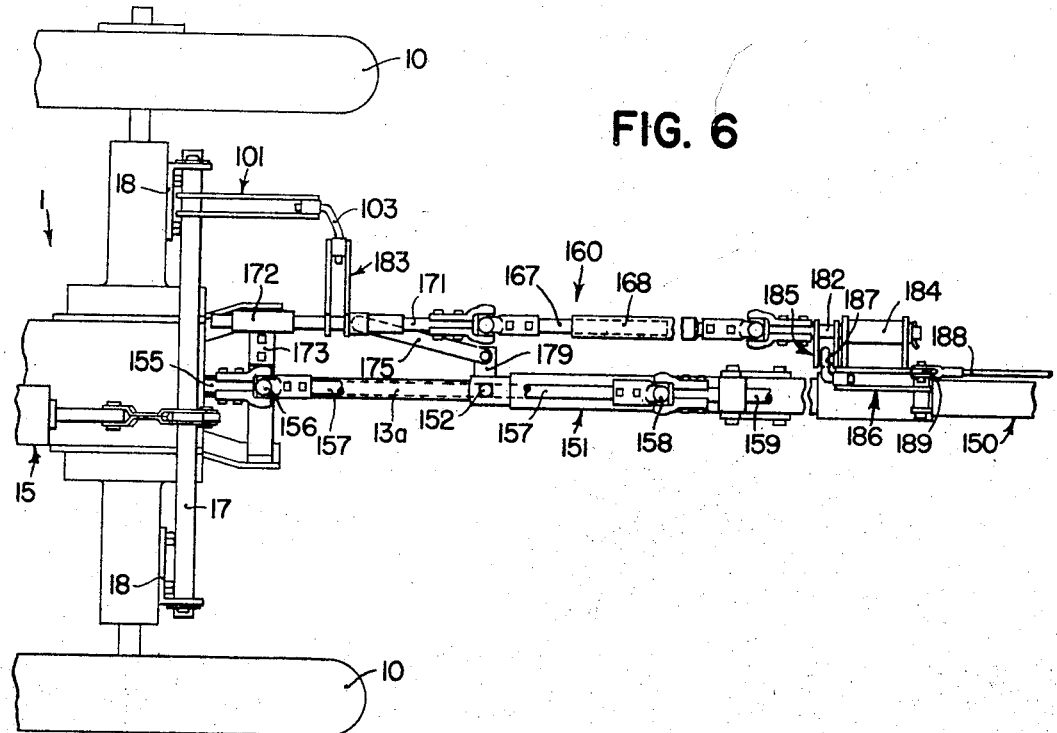
Figure 6 is a fragmentary plan view of a tractor-propelled implement in which a modified form of the present invention has been incorporated.
Figure 7:
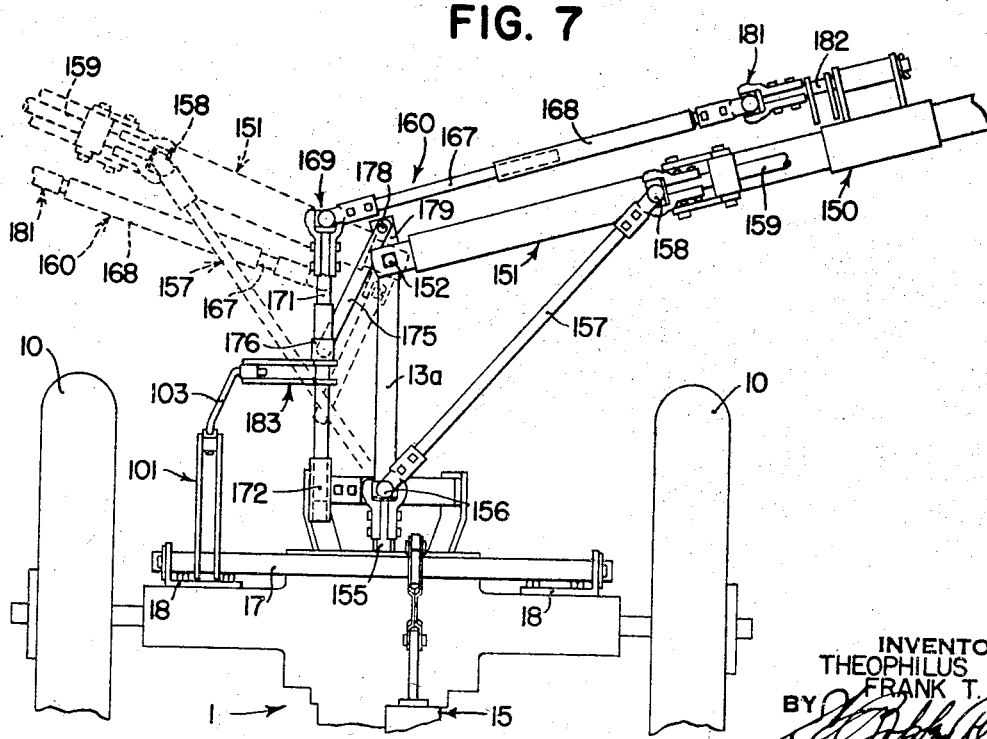
Figure 7 shows the relations between the power take-off shaft and the power lifting shaft when the implement is turned either to the right or left relative to the tractor.

A modified form of the present invention is shown in Figures 6 and 7. While the preferred form of the present invention is shown as embodied in a tractor propelled plowing implement, shown in Figures 1-5, it is to be understood that the present invention, particularly as regard the arrangement of the parts so that one of the universal joint axes is in a vertical position when the implement is raised, coinciding generally with the axis of pivotal movement in a horizontal direction between the implement and the tractor, is not to be limited to plows. In Figures 6 and 7 I have shown, more or less fragmentarily, an implement 150 which includes the forward hitch connection 151 pivoted to the drawbar 13a of the tractor for generally horizontal swinging movement about a pivot axis defined by the pivot connection 152. In this implement I have shown a power connection including a power take-off shaft 155 extending rearwardly from the tractor, a universal joint 156 connecting the power take-off shaft 155 with a power drive shaft 157, the latter being connected by a second universal joint 158 with a drive shaft 159 that extends to some operating part on the implement 150. Since for best operation it is desirable to have the universal joints 156 and 158 disposed adjacent the longitudinal vertical plane of the hitch pivot 152, it becomes desirable to mount the lifting torque shaft to one side of the pivot point 152 instead of over the same, as shown in Figures 1-5. The torque shaft mechanism for raising or lowering, or otherwise shifting, a part on the implement 150 is indicated by the reference numeral 160 and includes a pair of telescopic shaft sections 167 and 168 connected by a universal joint 169 to a short rock shaft 171 that is mounted for both rocking and sliding movement in a bearing 172 fixed by a bracket 173 to the drawbar or some other fixed part on the tractor. The longitudinal position of the short rock shaft 171 in its bearing 172 is controlled by a link 175, the forward end of which is connected by a collar 176 with the shaft 171 and the rear end of which is pivoted, as at 178, to an arm 179 disposed at one side of but adjacent the pivot 152. The arm 179 is secured to the hitch 151 of the implement. The rear end of the rear telescopic shaft section 168 is connected by a universal joint 181 to a short rock shaft 182 that is supported by a bracket bearing 184 on the implement 150. The shaft 182 is connected to the part on the implement 150 by any suitable means, such as an arm 185, a bell crank 186 mounted on or connected with the forward portion of the implement 150, a link 187 connecting the arm 185 and the bell crank 186, and a link 188 extending rearwardly from the upper arm 189 of the bell crank 186 back to the implement part to be controlled. The forward rock shaft 171 carries an arm 183 which is connected to be operated by the link 103 (Figures 1 and 2) and associated parts on the tractor controlled by the power unit 4, as described above.

Figure 6 shows the parts in the normal operating straight ahead position, the power drive shaft 155, 157, 159 extending generally longitudinally, with the lifting shaft 171, 167, 168, 182 also in longitudinal position alongside the power drive shaft. The implement and tractor may pivot one with respect to the other in a generally horizontal direction within limits and such pivoting will be accommodated by the universals 156, 158, and 169, 181, the consequent changes in the length of the torque shaft lifting connection being accommodated by a sliding movement of the rock shaft 171 in its bearing 172, under the control of the link 175. As in the modification described above, the crank shaft lifting connections are such that when the implement part is in its raised or transport position, one of the yokes of the forward universal joint 169 is disposed with its axis generally vertical. Being in this position, the lifting shaft connections 171 and 167, 168 may swing horizontally without interference.

Figure 7 shows the parts where the tractor has swung widely to the left relative to the implement. The resulting rearward movement of the arm 179 pulls the rock shaft 171 rearwardly relative to its bearing 172 so that the universal joint 169 is adjacent the pivot 152 but out of the way of the power drive shaft sections 155, 157. When the tractor is turned in the other direction, that is, to the right, as shown in dotted lines in Figure 7, the link 175 causes the rock shaft 171 to be moved forwardly in its bearing 172, thus keeping the universal joint 169 close to the pivot 152 but adjusting the position thereof so that it clears the power shaft connections.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In combination, a tractor having a power unit including a member movable about a generally longitudinal axis, an implement having a part adapted to be raised and lowered into and out of transport position and a member operatively connected with said part and swingable about a generally longitudinal axis for shifting said part, means connecting said implement with the tractor for generally lateral swinging movement about a generally vertical axis relative thereto, shaft means operatively connecting said members and including a universal joint spaced generally vertically from the means connecting the implement with the tractor, said universal joint and said members being arranged so that when said implement part is in its raised position one of the axes of said universal joint substantially coincides with said first vertical axis, whereby when the implement is in its raised position said lateral swinging movement of the implement relative to the tractor through relatively wide angles is accommodated.

2. In combination, a tractor having a source of power, an implement having a part adapted to be raised and lowered, detachable hitch means connecting said implement with the tractor, detachable operating connections between said source of power and said implement part whereby, when said implement is attached to the tractor, said part may be raised and lowered by energy derived from the tractor source of power, and means on the implement separate from said operating connections for holding said part in a given position when said hitch means and said detachable connections are detached.

3. An implement adapted to be attached to a tractor having a power operated member thereon, said implement comprising a part to be moved from one position to the other, power actuated connections extending between said part and said member on the tractor, said power operated connections being releasable to provide for detaching the implement from the tractor, and latch means on the implement optionally biased to engage said part for locking the same in raised position when the implement is detached from the tractor and to remain out of engaging position when the implement is connected with the tractor.

4. An agricultural implement including means serving as a frame, a movable part arranged to support at least a portion of the weight of said frame and movable relative thereto between raised and lowered positions, latch means movable into and out of engagement with said part, spring means connectible with and detachable from said latch means, said latch means being movable into engagement with said part when the latter is moved into a raised position and the spring means is disconnected from the latch means, whereby the latter acts against said part to prevent movement thereof into lowered position, and means separate from said latch and connected with said part for moving the latter into raised position, said spring means when connected with said latch means acting to disengage the latch means from said part following its movement by said raising means, whereby said latch means is moved by said spring means into a position clearing said part so as not to interfere with subsequent raising and lowering movements of said part.

5. In combination, a tractor having a power unit, an implement connected with the tractor for lateral swinging movement about a general vertical pivot axis and having a part adapted to be moved from one position to another, extensible torque shaft means operatively connected with said implement part and with said power unit on the tractor to derive operating energy therefrom for moving said part and disposed to one side of said pivot axis, and means separate from and connected with said extensible torque shaft means and responsive to the lateral swinging movement of the implement relative to the tractor for adjusting the effective length of said extensible means.

6. In combination, a tractor having a power unit, a rock shaft disposed generally longitudinally and operatively connected with said power unit to be actuated thereby, said rock shaft being carried on the tractor for generally longitudinal sliding movement relative thereto, an implement having a part adapted to be moved from one position to another, hitch means operatively connecting said implement with the tractor for generally lateral swinging movement about a vertical axis, torque shaft means extending from said tractor-carried rock shaft to said implement part and including universal joint means accommodating the lateral swinging movement of the implement relative to the tractor, said torque shaft means and said rock shaft being disposed to one side of said vertical axis, and means operated by the lateral swinging movement of the implement relative to the tractor for shifting said rock shaft generally longitudinally so as to dispose the torque shaft means in the proper position relative to said vertical axis in any lateral position of said implement.

7. In combination, a tractor having a power take-off shaft extending generally longitudinally and a power operated member swingable about a generally longitudinal axis and spaced laterally from the axis of said power take-off shaft, an implement having means to be driven from said power take-off shaft, a part to be shifted from one position to the other and a member swingable about a generally longitudinal axis for shifting said part, hitch means comprising two parts, one swingable laterally about a generally vertical pivot relative to the other, connected respectively with said tractor and said implement, power shaft means, including universal joint means accommodating said relative lateral movement, disposed substantially in the generally vertical longitudinal plane of said hitch means, extensible torque transmitting means extending from said swingable power operating member to said swingable implement member and disposed to one side of the plane of said power shaft means, and means responsive to the lateral swinging movement of the implement relative to the tractor for adjusting said extensible means to accommodate the lateral swinging of the power operating member on the tractor relative to the swingable implement member.

8. In combination, a tractor having a power unit including a member movable about a generally longitudinal axis and means for locking said member in one position, an implement having a part adapted to be raised and lowered into and out of transport position and a member operatively connected with said part and swingable about a generally longitudinal axis for shifting said part, means connecting said implement with the tractor for generally lateral swinging movement about a generally vertical axis relative thereto, shaft means operatively connecting said members and including a universal joint spaced generally vertically from the means connecting the implement with the tractor, said locking means acting through said tractor power operated member, said shaft means and said implement member for holding said implement part in one position, said universal joint and said members being arranged so that when said implement part is in said one position one of the axes of said universal joint substantially coincides with said first axis, whereby when the implement is in its raised position said lateral swinging movement of the implement relative to the tractor through relatively wide angles is accommodated.

9. In combination, a tractor having a power unit including a member movable about a generally longitudinal axis and means for locking said member in one position, an implement having a part adapted to be raised and lowered into and out of transport position and a member operatively connected with said part and swingable about a generally longitudinal axis for shifting said part, means connecting said implement with the tractor for generally lateral swinging movement about a generally vertical axis relative thereto, shaft means operatively connecting said members and including a universal joint spaced generally vertically from the means connecting the implement with the tractor, said locking means acting through said tractor power operated member, said shaft means and said implement member for holding said implement part in one position, said universal joint and said members being arranged so that when said implement part is in said one position one of the axes of said universal joint is substantially vertical and lies adjacent said first vertical axis whereby the implement is free to swing laterally relative to the tractor.

10. In combination, a tractor having a power unit including a member swingable through approximately ninety degrees of revolution, an implement connected with the tractor and including a part to be moved from one position to another and a member connected therewith for moving said part and also swingable about an axis through a part of a revolution, said members being swingable about generally longitudinal axes, a torque shaft operatively connecting said members, and universal joint means connecting said implement member with the member on the tractor, said universal joint means including a universal joint adjacent the tractor having parts connected together for movement about an axis that is substantially vertical when said tractor member is rocked to move said implement part into one position, whereby said implement is free to swing laterally relative to the tractor without causing rotation of said torque shaft when the implement shifts laterally.

THEOPHILUS BROWN.
FRANK T. COURT.